United States Patent
Roessl et al.

(10) Patent No.: US 10,054,692 B2
(45) Date of Patent: Aug. 21, 2018

(54) DETECTOR AND METHOD FOR DETECTING IONIZING RADIATION

(71) Applicant: KONINKLIJKE PHILIPS N.V., Eindhoven (NL)

(72) Inventors: Ewald Roessl, Ellerau (DE); Christoph Herrmann, Aachen (DE); Roger Steadman Booker, Aachen (DE); Klaus Jürgen Engel, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/536,321

(22) PCT Filed: Dec. 11, 2015

(86) PCT No.: PCT/EP2015/079330
§ 371 (c)(1),
(2) Date: Jun. 15, 2017

(87) PCT Pub. No.: WO2016/096622
PCT Pub. Date: Jun. 23, 2016

(65) Prior Publication Data
US 2017/0357013 A1 Dec. 14, 2017

(30) Foreign Application Priority Data

Dec. 17, 2014 (EP) .................................... 14198540

(51) Int. Cl.
*G01T 1/18* (2006.01)
*G01T 1/24* (2006.01)
(Continued)

(52) U.S. Cl.
CPC .............. *G01T 1/241* (2013.01); *G01T 1/208* (2013.01); *G01T 1/247* (2013.01); *G01T 1/28* (2013.01); *G01T 1/366* (2013.01); *G01T 1/185* (2013.01)

(58) Field of Classification Search
CPC ......................... G01N 21/645; G01N 21/6402
(Continued)

(56) References Cited

U.S. PATENT DOCUMENTS

2011/0155918 A1* 6/2011 Bouhnik ................. G01T 1/249
250/370.14

FOREIGN PATENT DOCUMENTS

| JP | 05336454 | 12/1993 |
| WO | 2004/021698 | 3/2004 |
| WO | 2014087290 | 6/2014 |

OTHER PUBLICATIONS

Ballabriga et al., "A 64 k pixel detector readout chip working in single photon counting mode with improved spectrometric performance", Nucl. Instr. and Meth. A, 2010.
(Continued)

*Primary Examiner* — David Porta
*Assistant Examiner* — Meenakshi Sahu

(57) ABSTRACT

The present invention relates to a detector (22') for detecting ionizing radiation, comprising: a directly converting semiconductor layer (36) for producing charge carriers in response to incident ionizing radiation; and a plurality of electrodes (34) corresponding to pixels for registering the charge carriers and generate a signal corresponding to registered charge carriers; wherein an electrode of the plurality of electrodes (34) is structured to two-dimensionally intertwine with at least two adjacent electrodes to register the charge carriers by said electrode and by at least one adjacent
(Continued)

electrode. The present invention further relates to a detection method and to an imaging apparatus.

20 Claims, 4 Drawing Sheets

(51) Int. Cl.
    *G01T 1/208*     (2006.01)
    *G01T 1/28*     (2006.01)
    *G01T 1/36*     (2006.01)
    *G01T 1/185*     (2006.01)

(58) Field of Classification Search
    USPC ........................................................ 250/374
    See application file for complete search history.

(56) References Cited

OTHER PUBLICATIONS

Cunningham et al., "Cosmic-ray detector with interdigitated-finger pixels for two-dimensional position information from a single wafer side", Proceedings of SPIE, vol. 1948, Oct. 19, 1993.

* cited by examiner

DETECTOR AND METHOD FOR DETECTING IONIZING RADIATION

CROSS REFERENCE TO RELATED APPLICATIONS

This application is the U.S. National Phase application under 35 U.S.C. § 371 of International Application No. PCT/EP2015/079330, filed Dec. 11, 2015, published as WO 2016/096622 on Jun. 23, 2016, which claims the benefit of European Patent Application Number 14198540.8 filed Dec. 17, 2014. These applications are hereby incorporated by reference herein.

FIELD OF THE INVENTION

The present invention relates to a detector for detecting ionizing radiation and a corresponding detection method as well as to an imaging apparatus.

BACKGROUND OF THE INVENTION

In medical diagnosis applications, the generation of images of a patient based on the detection of ionizing radiation is an important issue. In this context, various imaging methods and systems exist, such as computed tomography (CT), positron emission tomography (PET) and single-photon emission computed tomography (SPECT). Such imaging systems make use of detectors that allow the generation of images based on detected radiation.

As an alternative to scintillator detectors another option is to make use of a detector comprising a semi-conductor material (also called photon counting detectors, as e.g. known from WO 2014/087290 A1). Such a semi-conductor sensors, like cadmium-telluride or CZT for photon-counting direct-conversion detectors as potential candidates for CT, are unstructured contrary to their current-integrating non-spectral scintillator-based counterparts. This, however, may cause an increase in the susceptibility to cross-talk between neighboring detector pixels. This effect is often referred to as charge sharing.

Charge-sharing has two main degrading effects on imaging performance: first, the sharing of charges is stochastic as it depends on the interaction site of the x-ray. This leads to a complete loss of information on the energy carried by the original photon. Second, charge sharing carries signal out of one pixel into a neighbor, hence, will also affect the modulation transfer function of the detection system. For the above two reasons, the suppression and/or correction of charge sharing is highly desirable for semiconductor x-ray detectors.

In Ballabriga et al., A 64 k pixel detector readout chip working in single photon counting mode with improved spectrometric performance, Nucl. Instr. and Meth. A, 2010, a 256×256 channel hybrid pixel detector readout chip working in a single photon counting mode with a new inter-pixel architecture is presented. The chip aims to improve the energy resolution in pixelated detectors by mitigating the effects of charge sharing between channels. Charges are summed in all 2×2 pixel clusters on the chip and a given hit is allocated locally to the pixel summing circuit with the biggest total charge on an event-by-event basis. Each pixel contains also two 12-bit binary counters with programmable depth and overflow control. The chip is configurable such that either the dimensions of each detector pixel match those of one readout pixel or detector pixels are four times greater in area than the readout pixels. In the latter case, event-by-event summing is still possible between the larger pixels. Each pixel has around 1600 transistors and the analog static power consumption is below 15 µW in the charge summing mode and 9 µW in the single pixel mode. The chip has been built in an 8-metal 0.13 µm CMOS technology.

In US 2011/0155918 A1 systems and methods for providing a shared charge in pixelated image detectors are disclosed. One method includes providing a plurality of pixels for a pixelated solid state photon detector in a configuration such that a charge distribution is detected by at least two pixels and obtaining charge information from the at least two pixels. Tire method further includes determining a position of an interaction of the charge distribution with the plurality of pixels based on the obtained charge information.

In WO 2004/021698 A1 a detector arrangement for the conversion of electromagnetic radiation into electrical signals is disclosed. The detector arrangement includes sensitive areas where each sensitive area corresponds to a respective electrical signal, and at least two of the sensitive areas mesh with one another in such a manner that non-overlapping envelopes of the individual meshing sensitive areas also mesh with one another.

In Cunningham et al., Cosmic-ray detector with interdigitated-finger pixels for two-dimensional position information from a single wafer side, 1993, a type of cosmic ray detector for isotopic and energy detection of energetic nuclei is disclosed. Both dimensions of position information are derived from one side of the detector. This simplifies the required readout electronics.

However, there is still a need for improving photon counting detectors with respect to their susceptibility for charge-sharing effects.

SUMMARY OF THE INVENTION

It is an object of the present invention to provide an improved detector, detection method as well as an imaging apparatus including said detector with an increased accuracy and an improved image quality.

In a first aspect of the present invention a detector for detecting ionizing radiation is presented. The detector comprises:

a directly converting semiconductor layer for producing charge carriers in response to incident ionizing radiation; and a plurality of electrodes corresponding to pixels for registering the charge carriers and generating a signal corresponding to registered charge carriers;

wherein a central electrode of the plurality of electrodes is structured to two-dimensionally intertwine with at least two adjacent electrodes to register the charge carriers by said central electrode and by at least one adjacent electrode;

wherein said central electrode is structured to form a comb with comb-teeth to intertwine with comb-teeth of at least two adjacent electrodes forming a respective comb with comb-teeth; and wherein the comb-teeth of said central electrode alternate with the comb-teeth of the at least two adjacent electrodes in a longitudinal direction along which the central electrode and the two adjacent electrodes are arranged.

In another aspect an imaging apparatus is presented that comprises a radiation source for emitting ionizing radiation through an imaging area;

a detector as described above for detecting ionizing radiation from said imaging area;

a gantry for supporting said detector to rotate the detector around said imaging area; and a controller for controlling said detector to detect ionizing radiation at a plurality of projection positions during rotation around said imaging area.

In yet another aspect a detection method is presented that comprises the steps of:

receiving a central signal from a central electrode of a plurality of electrodes corresponding to pixels for registering charge carriers produced by a directly converting semiconductor layer in response to incident ionizing radiation, said central signal corresponding to registered charge carriers, said central electrode of the plurality of electrodes being structured to two-dimensionally intertwine with at least two adjacent electrodes to register the charge carriers by said central electrode and by at least one adjacent electrode, said central electrode being structured to form a comb with comb-teeth to intertwine with comb-teeth of at least two adjacent electrodes forming a respective comb with comb-teeth, the comb-teeth of said central electrode alternating with the comb-teeth of the at least two adjacent electrodes in a longitudinal direction along which the central electrode and the two adjacent electrodes are arranged;

receiving at least two additional signals from the at least two adjacent electrodes; and determining information on the location of the incident ionizing radiation and/or information on the energy of the incident ionizing radiation based on the central and the at least two additional signals generated by said at least two adjacent electrodes.

In yet further aspects of the present invention, there are provided a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, computer program and medium have similar and/or identical preferred embodiments as the claimed detector and as defined in the dependent claims.

The present invention is based on the idea that an alternative electrode structure in a photon-counting direct conversion detector can help to better cope with charge sharing. In a directly converting semiconductor layer incident ionizing radiation, i.e. an incident high-energy particle such as an X-ray photon causes the production of charge carriers. This may also be referred to as a radiation event herein. These charge carriers are then registered by means of electrodes. Usually, anodes register electrons. These anodes correspond to the pixels in the image to be generated. A plurality of electrodes registers the location, energy and intensity of the incident radiation and thereby allows generating a corresponding image.

Each radiation event usually results in the production of a plurality of charge carriers (that are simultaneously produced). Often one single electrode will register the charge carriers produced in response to a radiation event. However, depending on the location of this production (or conversion) it is possible that different electrodes register the charge carriers of one radiation event. If the charge carriers are registered by multiple neighboring electrodes (charge sharing) this may lead to an inaccurate localization of the incident radiation and to an inaccurate reading of its energy. The present invention allows coping with this issue.

According to the present invention the electrodes are structured in a form that each electrode two-dimensionally intertwines with at least two adjacent electrodes. Thus, each electrode intersects with at least two adjacent electrodes. Thereby, it becomes possible that the charge carriers are always registered by at least two electrodes. As used herein, intertwine means that electrodes are structured to overlap to a certain degree. For instance, the electrodes may be structured such that protruding sections of one electrode connect with correspondingly formed adjacent electrodes. As used herein, adjacent refers to spatially neighboring, and adjacent electrodes are isolated from each other.

The charge carriers are always registered by at least two adjacent electrodes. This corresponds to an inherent charge sharing, which can, however, be compensated by calibration since the dimensions of the intertwining sections of the electrodes are known in advance. By registering each event with at least two electrodes, the readings of these two electrodes may be analyzed and it may be determined which of the electrodes should be considered to correspond to the location of the incident radiation.

Herein, the structure and the functionality of the detector are described based on the structure and the processing of one electrode. It is to be understood that the other electrodes of the plurality of electrodes are structured equally. Usually, the electrodes will be arranged in a line or in a two dimensional array. The signals generated by all electrodes (all channels) are processed equally. It is possible that the electrodes form a curved structure or a planar arrangement. Usually, the electrodes will be arranged substantially perpendicular to the incident radiation. Obviously, depending on the geometry of the detector, it is possible that some electrodes (e.g. the electrodes at the border of the detector which do not have adjacent electrodes on all sides) may require a separate consideration and processing.

The detector of the present invention allows overcoming the disadvantages of charge-sharing, i.e. the loss of information on the energy carried by the incident photons (incident ionizing radiation) and the inaccuracy resulting from the modulation of the transfer function of the detection system. A detector according to the present invention allows obtaining an improved spectral performance and resolution performance in comparison to previous approaches. In diagnostic medical X-ray imaging devices, like mammography scanners or CT scanners, this may eventually result in an improved treatment of patients.

According to a first embodiment the detector comprises readout electronics for determining information on the location of the incident ionizing radiation and/or information on the energy of the incident ionizing radiation based on a central signal generated by said electrode and at least two additional signals generated by said at least two adjacent electrodes. Such readout electronics may particularly be implemented in hard- and/or in software. The location of the incident ionizing radiation refers to the location of the incident high-energy photon or particle in the directly converting semiconductor layer. The signals generated by the different electrodes or pixels (channels) are evaluated to derive therefrom which of the electrodes is to be attributed the currently evaluated radiation event. Furthermore, information on the energy of the incident ionizing radiation is determined. This energy refers to the energy of the primary event, i.e. the incident ionizing radiation, which is determined on an evaluation of the signals of the different electrodes. The inclusion of readout electronics allows obtaining this information and eventually obtaining an image of a person or object being subject to imaging in an imaging apparatus comprising the detector of the present invention. As used herein the central signal refers to the signal of one electrode and the additional signals refer to signals of electrodes that are adjacent to the central electrode. Usually, the same processing will be applied to each channel as described above.

In a preferred embodiment, said electrode is structured to form a comb with comb-teeth to intertwine with at least two adjacent electrodes, said adjacent electrodes being equivalently formed; and the comb-teeth of said electrode alternate with comb-teeth of the at least two adjacent electrodes. One possibility for the intertwined electrode structure according to the present invention is to make use of a comb-structure. Each electrode is structured in the form of a comb with comb-teeth. Then, it is possible that the comb-teeth of two adjacent electrodes intertwine with one another. Particularly, each comb-shaped electrode may intertwine with adjacent electrodes on two sides. One advantage resulting from this structure is that it becomes possible to structure each electrode to intersect with neighboring electrodes with half of its surface. Furthermore, all electrodes may be equivalently formed which may facilitate the manufacturing process and the signal processing.

In an embodiment the plurality of electrodes is arranged in a line substantially perpendicular to the direction of the incident ionizing radiation; and said electrode is structured to intertwine with a first adjacent electrode on one side and a second adjacent electrode on the other side. As used herein, substantially perpendicular means that the distance to the radiation source emitting the ionizing radiation is more or less constant. Thus, the electrode structure may not only be planar but may also be slightly curved in the case of a point source. If the electrodes are arranged in line, each electrode has two neighboring electrodes on its two sides. For the signal processing this means that for each electrode the signal generated by this electrode is processed in combination with the signals generated by two adjacent electrodes. One example for a line structure is a sequence of alternatingly aligned comb-shaped electrodes as described above.

Further preferably a first half of said electrode intertwines with half of a first electrode of the two adjacent electrodes and a second half of said electrode intertwines with half of a second electrode of the two adjacent electrodes. A structure in which each electrode intersects or intertwines with two adjacent electrodes with half of its surface allows for an efficient processing since the signals generated by the two electrodes are basically directly comparable. Thus, for one radiation event, comparing the signals generated by two adjacent electrodes allows directly determining which of the two adjacent electrodes has received the full charge generated by the radiation event and which of the two electrodes has only received part of the charge. The location of the electrode having received the full charge can be considered to better correspond to the location of the incident radiation. This, however, usually requires the electrodes having about twice the size of the diameter of the charge cloud.

In a preferred embodiment of the detector the readout electronics is configured to compare a signal level of the central signal with signal levels of the at least two additional signals and to determine a location of the incident ionizing radiation corresponding to a location of said electrode if the signal level of the central signal is higher than the signal levels of the at least two additional signals. The locations of the electrodes are known. Depending on the outcome of the comparison of the signal levels generated by one electrode with the signal levels generated by its adjacent electrodes, it is determined whether or not the location of the electrode can be considered to correspond to the location of the incident radiation, i.e. the location of the radiation event. This evaluation is based on the signal levels of the generated signals. Signal level as used herein may particularly refer to the energy of the signal. The peak corresponds to the pulse amplitude. If the signal level of the central signal, i.e. the signal generated by the electrode currently under evaluation, is higher than the signal levels of the at least two additional signals, i.e. the signals generated by the at least two adjacent electrodes, this indicates that the electrode currently under evaluation is the electrode that has received the full charge of the incident radiation. In other words, since it is assured that always one electrode captures the full charge of the incident radiation it can be deduced that the electrode with the highest signal level corresponds to the electrode that has captured the full charge. Thus, the location of this electrode corresponds to the location of the incident ionizing radiation.

Preferably, the readout electronics is configured to increase a counter corresponding to said electrode if the location of said electrode is determined to correspond to the location of the incident ionizing radiation. A counter counts the radiation events attributed to each of the electrodes. In other words, the number and the energy of the radiation events that are registered with each electrode are counted. Based on this counter it then becomes possible to reconstruct an intensity or energy distribution which forms the basis for reconstructing an image of a subject under examination in an imaging apparatus including a detector as disclosed herein. Such a counter may be implemented in hard- and/or in software. A multi-bin ASIC usually has at least as many counters as energy bins or energy thresholds. The selection of the counter to be incremented depends on the registered energy, i.e. within energy discriminators (bin) or above energy threshold (counts above threshold).

In a preferred embodiment the readout electronics includes a comparator for comparing the signal level of the central signal to a predefined threshold for rejecting a noise signal corresponding to undesired noise effects by means of energy discrimination. Usually, all channels will have a comparator. This comparator rejects pulses, i.e. signals generated by electrodes, with too small amplitude that indicates a high likelihood of being caused by electronic noise (and not charge sharing or true signals). This allows eliminating the effects of undesired noise caused by the electronics or other undesired influences. Only signals are processed that have a signal level above a predefined threshold. This predefined threshold may be determined in a calibration procedure or may also be analytically calculated. In a multi-bin ASIC there will typically be 4, 5 or 6 comparators per channel. Then, the first comparator serves the purpose of rejecting noise effects and the further comparators are used for energy separation.

In a further preferable embodiment the readout electronics includes a peak detector for determining a peak of the signal level of the central signal and a comparator for comparing said peak to peaks of the signal levels of the at least two additional signals. This peak detector determines the pulse amplitude of the signal generated by the electrodes. This peak or pulse amplitude is compared to the peak or pulse amplitude of signal levels of the additional signals generated by the adjacent electrodes. Thereby, it becomes possible to determine which of the electrodes has received the full charge.

Preferably, the electrodes of the plurality of electrodes have the same size and shape. This allows an efficient manufacturing process. Furthermore, the processing of the signals of the different electrodes can be standardized.

In another embodiment the plurality of electrodes is arranged in a plane perpendicular to the direction of the incident ionizing radiation; and said electrode is structured to intertwine with at least three adjacent electrodes to form a two-dimensional grid. If a two-dimensional detector is desired, i.e. a substantially planar detector, it is required that each electrode intertwines with at least three adjacent electrodes. A detector in the form of a plane has the advantage that less movement relative to a subject under examination in an imaging apparatus may be required in comparison to a line detector. However, an electrode structure in which each electrode intertwines with at least three adjacent electrodes is more complicated to manufacture and requires a more elaborate calibration to be carried out.

Preferably, the size of said electrode is larger than twice the diameter of a cloud of charge carriers produced simultaneously. Usually one radiation event, i.e. one incident high-energy particle, generates a plurality of charge carriers in the directly converting semiconductor layer. This may be referred to as a cloud of charge carriers. This cloud of charge carriers is registered by means of the plurality of electrodes. Thus, one radiation event usually corresponds to one cloud of charge carriers.

BRIEF DESCRIPTION OF THE DRAWINGS

These and other aspects of the invention will be apparent from and elucidated with reference to the embodiment(s) described hereinafter. In the following drawings FIG. 1 schematically illustrates an imaging apparatus according to an aspect of the present invention.

DETAILED DESCRIPTION OF THE INVENTION

Figure 1:
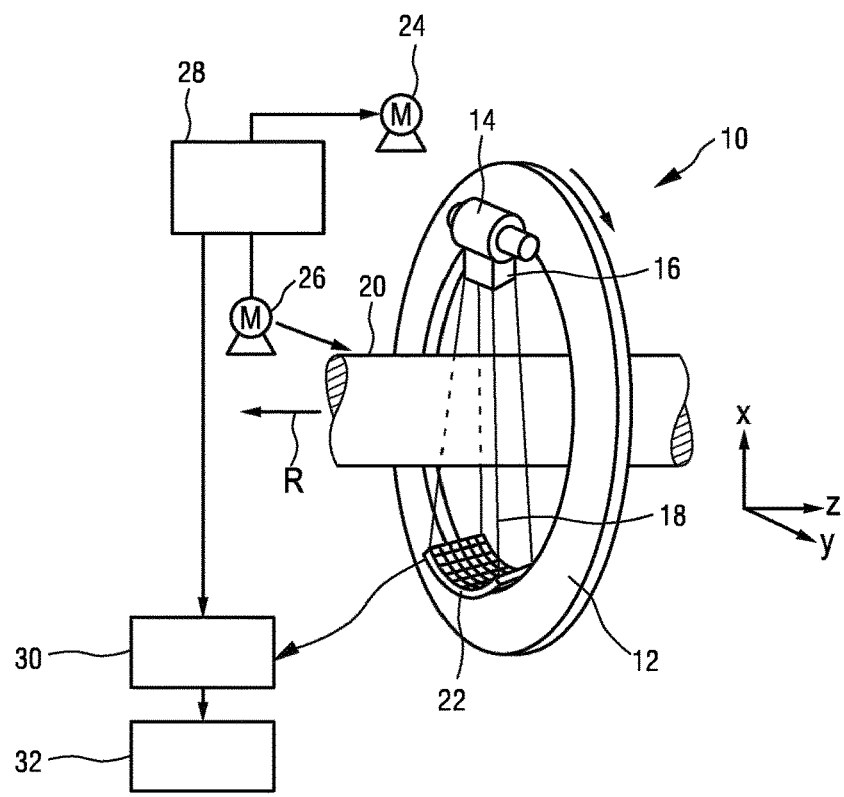

FIG. 1 shows schematically and exemplarily an imaging apparatus 12 according to the present invention for imaging an object, in this example being a computed tomography (CT) apparatus. The CT apparatus 10 includes a gantry 12, which is capable of rotation about a rotational axis R, which extends parallel to a z direction. A radiation source 14 (also called photon source), which may be a polychromatic x-ray tube, is mounted on the gantry 12. The radiation source 14 is provided with a collimator 16, which forms a (e.g. conical) radiation beam 18 from the radiation (photons) generated by the radiation source 14. The radiation traverses an object of examination, such as a patient, arranged in an (e.g. cylindrical) imaging area 20 (also called examination zone). After having traversed the imaging area 20, the radiation beam 18 is incident on an x-ray detector 22 (detector for detecting ionizing radiation), which comprises a two-dimensional detection surface. The detector 22 is also mounted on the gantry 12.

The CT apparatus 10 comprises two motors 24, 26. The gantry 12 is driven at a preferably constant but adjustable angular speed by the motor 24. The motor 26 is provided for displacing the object, for example, a patient, who is arranged on a patient table in the imaging area 20, parallel to the direction of the rotational axis R or the z axis. These motors 24, 26 are controlled by a control unit 28, for instance, such that the radiation source 14, the detector 22 and the imaging area 20 move relative to each other along a helical directory. However, it is also possible that the object is not moved, but that only the radiation source 14 and the detector 22 are rotated, i.e. that the radiation source 14 moves along a circular trajectory relative to the object or the imaging area 20. Furthermore, in another embodiment, the collimator 16 can be adapted for forming another beam shape, in particular a fan beam, and the detector 22 can comprise a detection surface, which is shaped corresponding to the other beam shape, in particular to the fan beam.

During a relative movement of the radiation source 14 and the imaging area 20, the detector 22 generates signal (also called detection signals or detection values; preferably one signal value per pixel, i.e. per detection element) depending on the incident ionizing radiation. Often, the signals are evaluated in readout electronics that may be included in the detector 22 or that may also be integrated in a reconstruction unit 30 for reconstructing an image of the object based on the detection values. The image reconstructed by the reconstruction unit 30 may be provided to a display unit 32 for displaying the reconstructed image. The control unit 28 is preferentially also adapted to control the radiation source 14, the detector 22 and the reconstruction unit 30.

A photon-counting direct converting detector usually comprises a directly converting semiconductor layer, e.g. cadmium telluride or CZT (cadmium-zinc-telluride). In this layer, charge carriers, i.e. particles carrying an electric charge such as electrons and holes are produced in response to incident ionizing radiation. By means of an electric field between an anode and a cathode, the charge carriers are detected via a plurality of electrodes. In other words, an incident photon (e.g. an x-ray photon) generates a charge carrier or a cloud of charge carriers upon incidence in the layer. By evaluating the number of charge carriers detected at the different electrodes it becomes possible to obtain a reading of the spatial location of the incident radiation in the directly converting semiconductor layer. Therefrom, an image of an object in the imaging area can be derived.

Figure 2:
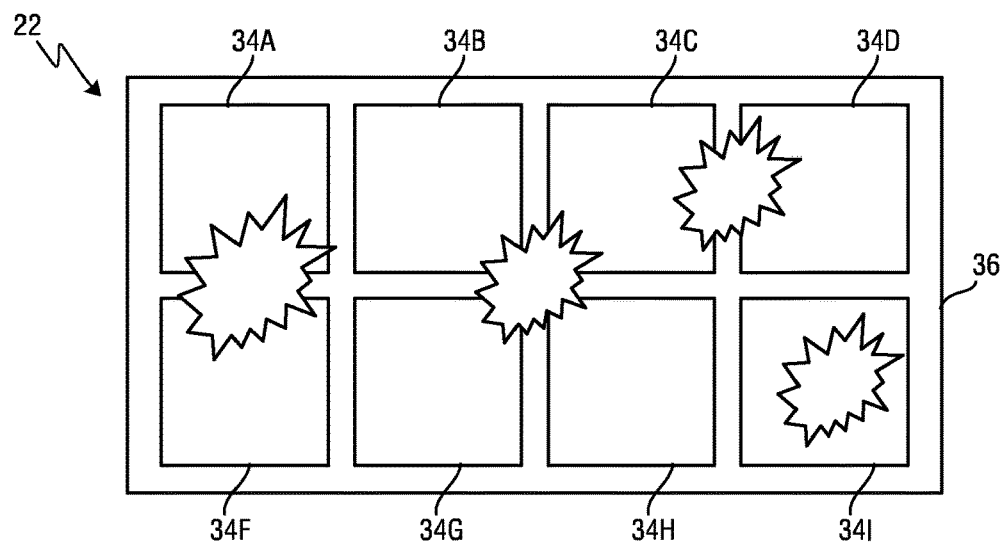
FIG. 2 schematically illustrates the effect of charge sharing between different electrodes in a state of the art detector.

The effect of charge-sharing between electrodes of the detector contributes to detector cross-talk and degrades both, spectral performance and spatial resolution performance of semi-conductor detectors. A schematic illustration of the effect of charge sharing between neighboring pixelated anode channels in state of the art detectors is illustrated in FIG. 2. The illustration shows the detector 22 in top view. The illustrated plurality of electrodes 34A-34F may correspond to metallized anode pads on the directly converting semiconductor layer 36 in the illustrated example. Incident ionizing radiation, e.g. x-ray photons, hits the semiconductor and charge carriers are produced. In FIG. 2, four different locations of interactions (corresponding to charge clouds) are illustrated. In an ideal situation, the interaction of the x-ray photons to be detected takes place in a region well centered around one particular metal anode, like in the case of the anode 341. In case the interaction site is on the line connecting the centers of the pixel anodes of two adjacent pads, the charge generated by the x-rays will be shared between the two channels and two signals in the corresponding electronic channels will be observed like in the case of the event occurring between anode 34A and anode 34F or the event occurring between anode 34C and anode 34D. In the (rare) event of the interaction site being coincident with the common corners of 4 electrodes, the charge might be even distributed over 4 channels and 4 correlated signals will be generated in 4 different channels (anodes 34B, 34C, 34G and 34H).

Through charge sharing, the proportionality between the incident x-ray energy and the collected charge in a given channel is lost. Furthermore, charge sharing may lead to imperfect registration, or localization of the interaction event. Consequently, it is required that the very occurrence of the charge sharing effect is detected. Further, the effect must be quantified and a comparison must take place between signals participating in the charge sharing. Still further, an allocation process must identify the pixel to which the event must be allocated. This pixel must be allocated the event whereas other participating pixels must be prevented from registering the event.

In order to provide this functionality, the present invention proposes to make use of an intertwined electrode structure. This intertwined electrode structure has the effect that charge carriers resulting from incident radiation are always registered by a plurality of anodes. Then, the signal from one electrode may be evaluated jointly with the signals from spatially adjacent electrodes allowing obtaining a more accurate reading of the location of the incident radiation and/or on its energy.

Figure 3A:
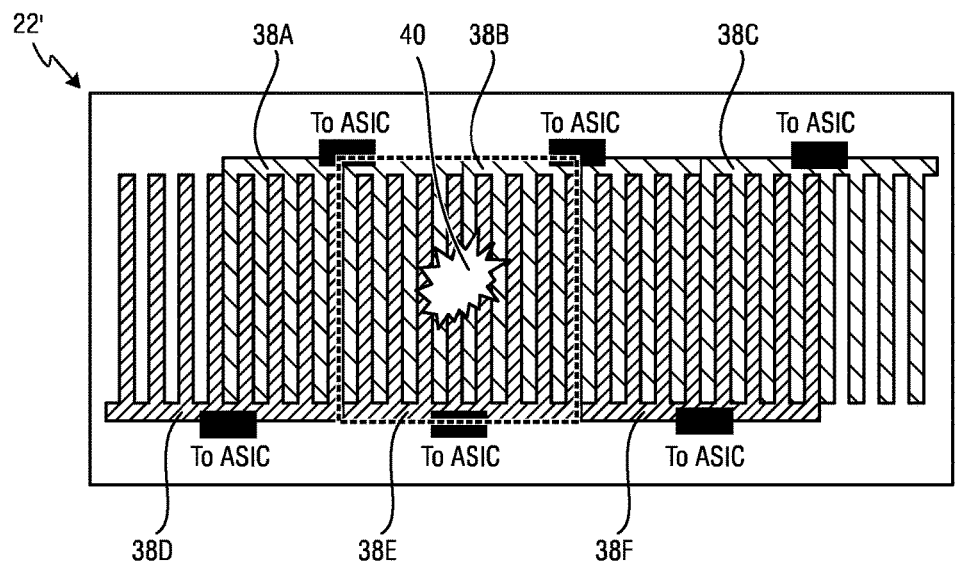
FIGS. 3a and 3b schematically illustrate an intertwined electrode structure and the effect of charge sharing in this intertwined structure.
Figure 3B:
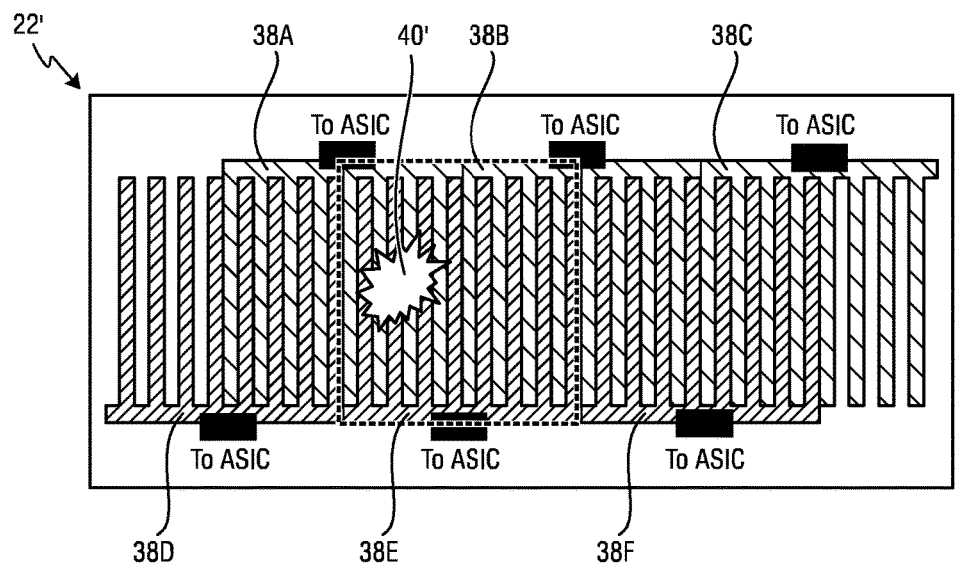

In FIGS. 3a and 3b a one dimensional embodiment of a detector 22' according to the present invention is disclosed. Referring back to FIG. 2, it will not be possible to detect the charge sharing between two adjacent anodes in case the signals are processed individually. This is due to the fact that the interaction site is located in between two pixels. To avoid this, a more sophisticated anode structure design is proposed as illustrated in FIGS. 3a and 3b. A total of six electrodes 38A-F are illustrated. The electrodes are structured in the form of a comb with comb-teeth. It is to be understood that the detector will usually extend along its longitudinal axis in both directions and will include hundreds or thousands of equally structured electrodes. The dashed line encircles an effective pixel corresponding to one anode 38E. The illustrated electrodes are structured in the form of a comb. One electrode intertwines with two adjacent electrodes in the illustrated example. For instance, electrode 38E partially intertwines with electrodes 38A and 38B. The electrodes 38A-38F are structured such that the combination of two comb grids is filling a rectangular area without holes. The comb-teeth of two adjacent electrodes alternate. Preferably, the comb grids are interweaved in a symmetric regular fashion but are offset by one half an effective pixel. For illustration purposes, the anode structure is shown here without gaps. In a functioning realization the anodes and in particular the comb-teeth (may also be referred to as "anode fingers") need to be separated spatially to ensure electrical isolation.

For the intertwined electrode structure according to the present invention, whatever the interaction site of an incident x-ray photon is, there always exists at least one pixel comb unaffected by the charge sharing. Obviously, due to the built-in comb structure there always is charge sharing between adjacent electrodes. However, this built-in charge sharing is known (since the structure of the electrodes is known) and can be automatically eliminated by an energy calibration. In this sense, the intertwined comb structure would serve as a simple means of signal duplication in case the pixel combs were not offset by half a pixel.

In FIG. 3a the charge cloud 40 is correctly quantified by electrode 38E. The two adjacent electrodes 38A and 38B record only about one-half of the charge. In FIG. 3b the charge cloud 40' is correctly quantified by electrode 38E and adjacent electrode 38A.

Thus, if it is assumed that the charge cloud is smaller than half of the size of one comb electrode, there is always one electrode that samples the full energy peak (photo-peak) and therefore allows correct quantification of the energy of the event. With a full width half maximum (FWHM) of the charge cloud diameter of 80 µm, a single comb-tooth would have to have a width of approx. 4 µm (assuming a gap also of 4 µm between each comb electrode). Thus, if 80 µm for the diameter of the charge cloud is assumed, 160 µm for the pixel would be needed. If it is assumed that each comb-structured electrode has eight comb-teeth and 2 non-metallized areas in between opposing comb-teeth of adjacent electrodes, a width of a comb-tooth and a spacing of about 160/32=5 µm or a width of a comb-tooth of 6 µm and a width of the spacing of 4 µm would be possible. These measures are to be understood as an example only. According to the present invention the signals generated by one electrode may be evaluated in conjunction with the signals generated by at least two adjacent electrodes.

It is clear that the illustrated structure in FIG. 3 is for illustration purposes only. The invention is not limited to a line structure but may preferably also be applied with structures that allow covering a two dimensional area.

Figure 4:
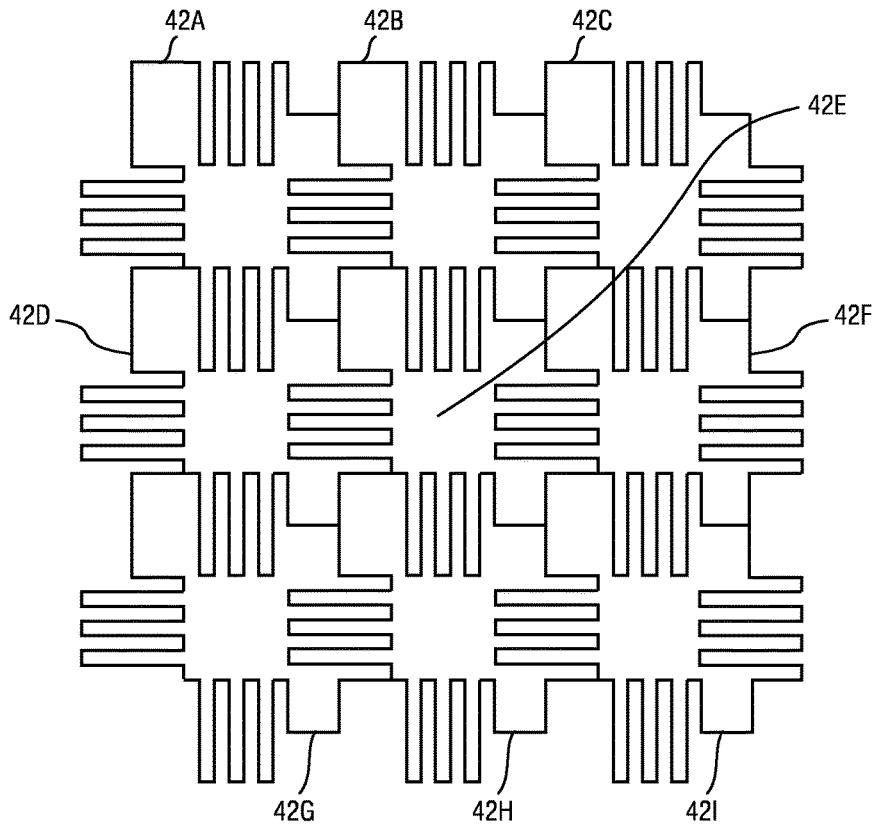
FIG. 4 schematically illustrates another embodiment of an intertwined electrode structure for use in a detector according to the present invention.

Another possible structure for covering a plane is illustrated in FIG. 4. One central electrode 42E has eight adjacent electrodes 42A-D and 42F-I. Again, it is to be understood that only a section of a structure is illustrated. Usually, a detector will include hundreds or thousands of pixels arranged in a rectangle which may be plane and perpendicular to the incident ionizing radiation or which may also be curved so that a constant distance to the radiation source is obtained. Again, each electrode is intertwined with adjacent electrodes (eight adjacent electrodes in this example). A plurality of further structures is possible.

Usually, each channel or each pixel, respectively (corresponding to an electrode) will be evaluated under consideration of the channels of adjacent electrodes according to the present invention. For evaluating the signals of the intertwined electrodes, usually readout electronics are used. For this, it may be possible to use an IC structure or an ASIC, i.e. a hardware. It may, however, also be possible that the signals are (partly) evaluated in software, i.e. that some or all of the processing steps are implemented in software to be carried out on a processor.

According to the present invention, the readout electronics (or the corresponding software) makes use of the signal of each channel. For each electrode (central signal) the signal is compared to the signals of the two or more adjacent electrodes and it is determined which of the signals is largest (has the highest level). In case the central signal is the largest, the count is registered, i.e. the incident radiation event is counted for this electrode. If, however, a signal of an adjacent electrode is larger, the count is not registered for the electrode under evaluation. This procedure allows that counts are triggered only by signals that were not subject to charge sharing and that the allocation of counts is also spatially correct. It is to be understood that all channels will usually be processed equivalently. Thus, one electrode is considered the adjacent electrode for another and vice versa.

Figure 5:
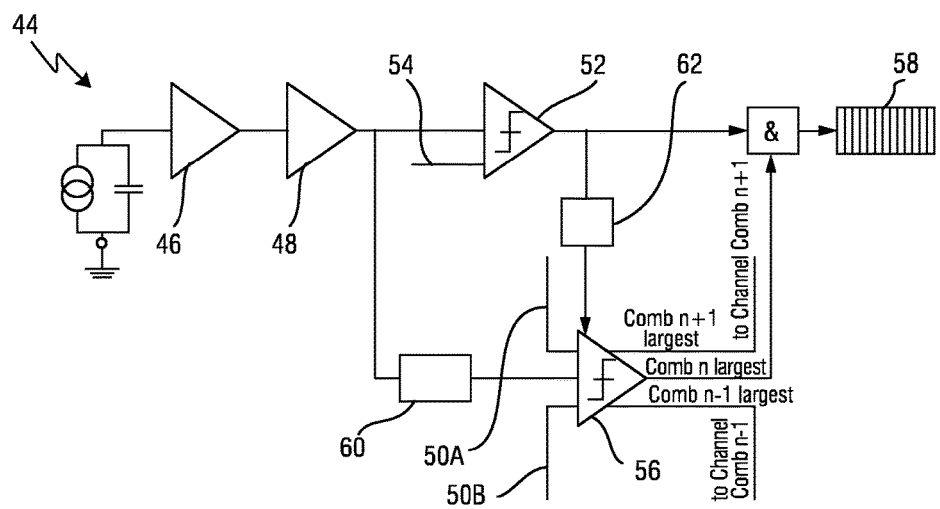
FIG. 5 schematically illustrates readout electronics for use in a detector according to an aspect of the present invention.

In FIG. 5 an implementation of readout electronics for the above outlined procedure is illustrated. Again, the case where an electrode has two adjacent electrodes as illustrated in FIG. 3 (electrodes are substantially arranged in a line in which each electrode n has two neighboring electrodes n−1 and n+1) is considered as an example. Each channel input has a conventional (or other) means to provide a pulse height signal representative of the input charge (i.e. CSA 46+Shaper 48). The input of the additional signals provided by the two adjacent electrodes 50A, 50B will usually be equivalently preprocessed. The energy discrimination is obtained by means of a comparator 52 set to a pre-defined threshold 54 (energy level). It is clear that, in other embodiments, there may be more discriminators effectively implementing an energy resolving detector. The detection of an incoming event triggers the charge sharing comparison 56, that is; the signal level produced by a peak detector 60 at the output of the Shaper 48 is compared in a 3-way comparator 56 to establish which of the electrodes (n+1; n; n−1) collected the most charge. As described above with respect to FIG. 3, given the geometry of the comb, at least one of the electrodes will receive the complete charge (½ of the charge generated by the interaction). By definition, the largest signal of the considered electrodes must necessarily be the one that registers the full event within the limits of its associated equivalent pixel area. A 3-way comparator 56 is therefore used to produce a digital logic signal that indicates which one of the three had the largest signal (case A). If the event is shared equally between two combs (case B), the comparison will still decide on one single comb due to the inherent differences between the signals (e.g. noise). In other embodiments, depending on the electrode configuration, it is possible that the comparator obtains further input signals (e.g. line configuration versus planar array). Then, a counter 58 linked to the comb with the largest signals is the only one enabled to increment in response to the registered event. As noise in the two channels might be partially independent, it might happen that both or none of the two electrodes would then register the count. Depending on the implementation, it may be possible that the output of the 3-way comparator 56 is fed back to the adjacent electrodes to avoid this effect.

Since, in contrast to the comb structure as illustrated in FIG. 3, the overlap of each electrode with the adjacent electrodes is not one half in the example illustrated in FIG. 4, a corresponding calibration needs to be performed to make the signals comparable.

Furthermore, in the exemplary readout electronics illustrated in FIG. 5, only one energy threshold is considered. This present invention, however, does not restrict the use of multi-energy discrimination.

The peak detector 60 illustrated in FIG. 5 offers the maximal pulse-height value for a given event. The delay introduced by delay means 62 to the 3-way comparator 56 is required to ensure that the peak detector 60 has acquired the total charge. This dominates the speed of the acquisition as a peak detector requires being reset before it can again serve its purpose.

It is to be understood that further embodiments of this implementation may consider the use of multiple peak-detectors in parallel (multiplex by event trigger) in order to avoid the aforementioned limitation. For instance, the comparator may be built such that logic prevents from having more than output active high, i.e. all output are mutually exclusive and only one output can be active at any given time, even in the event of having exactly similar amplitudes. Multiple methods exist (determined by hardware priority, delay with inhibit . . . ).

In yet another embodiment, the peak detector 60 may be not required. Since charge sharing events are shared across combs in an instantaneous time, the result of the 3-way comparison can be obtained by simply continuously latching the largest signal throughout the collection time.

Figure 6:
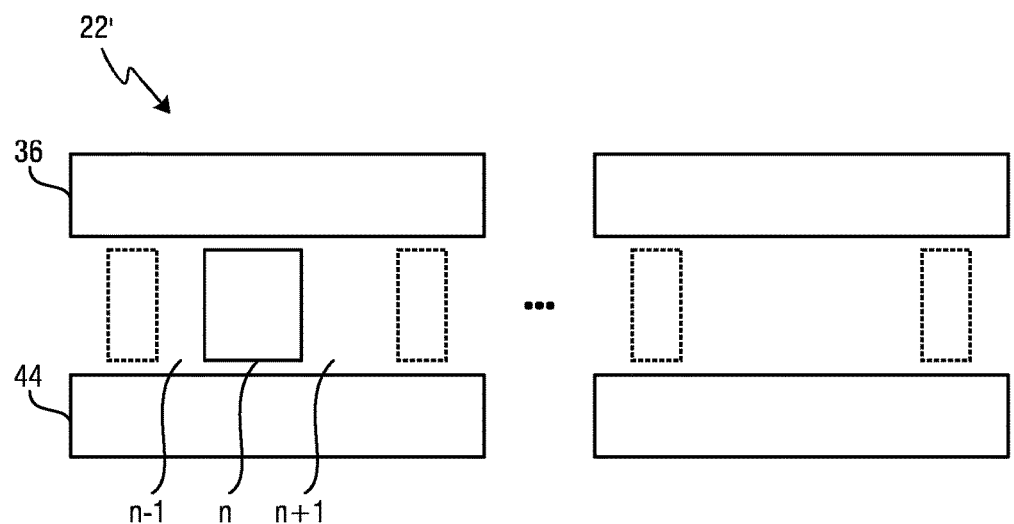
FIG. 6 schematically illustrates a detector according to the present invention in side view.

In FIG. 6 a side view of an embodiment of a detector 22' according to the present invention is illustrated. Again the example corresponds to a line structure, e.g. the comb structure illustrated in FIG. 3. One electrode n has two adjacent electrodes n+1 and n−1. Usually, the directly converting semiconductor layer 36 will be arranged between the electrodes and the radiation source. The readout electronics 44 may be arranged below the electrodes.

Figure 7:
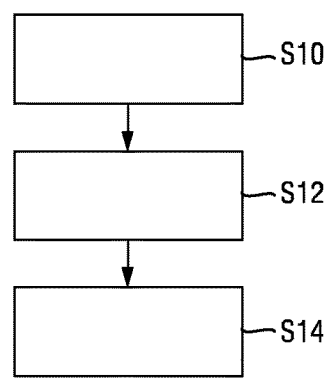
FIG. 7 schematically illustrates the steps of a method according to an aspect of the present invention.

In FIG. 7, a detection method according to an aspect of the present invention is illustrated. In step S10 a central signal is received from an electrode of a plurality of electrodes. In step S12 at least two additional signals from the at least two adjacent electrodes are received. In step S14 information on the location of the incident ionizing radiation and/or information on the energy of the incident ionizing radiation based on the central and the at least two additional signals generated by said at least two adjacent electrodes is determined.

Such a method may be carried out on a processor connected to a detector as described above and thereby implement some or all of the functionalities of the readout electronics in software.

In further preferred embodiments, in particular as illustrated in FIGS. 3a and 3b, the comb-teeth have a rectangular form; the first adjacent electrode is spaced apart from the second adjacent electrode by one comb-tooth of said central electrode; and/or the comb-teeth have equal width in said longitudinal direction.

In another preferred embodiment the readout electronics is configured to determine an energy of the incident radiation based on a multiplication of the signal level of the central signal by two.

As used herein, the central electrode refers to an electrode which has two adjacent electrodes on two sides. The term central electrode is used to explain the electrode arrangement. For instance, electrode 38B of FIGS. 3a and 3b can be considered the central electrode. Then, electrodes 38A and 38B are the two adjacent electrodes. However, any electrode can be considered to represent the central electrode as long as it has two adjacent electrodes on two sides.

In FIGS. 3a and 3b, it is illustrated that the comb-teeth of the central electrode alternate with comb-teeth of the adjacent electrodes in a longitudinal direction along which the central electrode and the two adjacent electrodes are arranged. For instance, the comb-teeth of electrode 38B alternate with the comb-teeth of electrodes 38E and 38F. The longitudinal direction is defined by the central electrode and the two adjacent electrodes and corresponds to the left-right direction in FIGS. 3a and 3b. In other words, if the electrodes are substantially arranged in a line perpendicular to the direction of the incident radiation, the direction of this line defines the direction of the alternation of the comb-teeth. Along this line, one comb-tooth of one electrode alternates with one comb-tooth of another electrode.

In comparison to prior art anode configurations considering a division of a pixel into two different anodes within a pixel there is thus no pixel as such according to the present invention but rather an "effective pixel". In comparison to anodes intersecting in a triangular shape, the benefit of the structure of the present invention is that when an interaction is detected, the highest signal is known to correspond to exactly one half of the total charge. Thus, in other words, at least one of the anodes, as they are interleaved, will always see one half of the energy. That is to say, by locating the pixel with the largest signal, not only the location but also the charge of the impinging photon can be determined by knowing that a correction factor of two is required. Thus, in comparison to prior art approaches, it is not required to sum the charges across anodes.

In an embodiment of the invention this effect is achieved by providing comb-tooth, i.e. "fingers" of the comb-like electrode in the form of straight bars, i.e. rectangular bars (as, e.g. illustrated in FIGS. 3 and 3b) and not, e.g. like triangles. The rectangular "fingers" have a constant width. An interaction anywhere along those "fingers" rectangular will have the same result. In comparison to other forms, e.g. triangular forms, the total charge will depend on how far into the triangle they are.

Further, in a preferred embodiment of the invention (as, e.g. illustrated in FIGS. 3 and 3b) there is no central region where only one electrode registers an event. A triangular form of electrode fingers may be that the charge registered by the event is proportional to its position. Exploiting this would, however, require that it is known in advance which charge to expect. Thus, fo determining the total charge, it would still be required to add the charge of all electrodes. This is not required by the present invention.

According to a preferred embodiment of the present invention the comb-teeth are alternately arranged in vertical direction (as, e.g. illustrated in FIGS. 3 and 3b) so that each event is registered by at least two electrodes. The effective ASIC pixels are sort of staggered with respect to the "effective pixel". Thus, it is always the case that two electrodes see the charge, i.e. register the event. The charge sharing is therefore exactly known and one electrode will always register one half of the charge. Thus the total charge can be obtained from a multiplication by two.

The electronic front-end described herein (as, e.g. illustrated in FIG. 5) considers a plurality of anodes to locate which anode had the largest signal and therefore one half of the charge.

The design disclosed herein thus guarantees that the charge generated in every x-ray interaction is causing a signal indicative of the full energy of this event in at least one ASIC channel. Thus, in other words, the present invention proposes not only an intertwined but also an interleaved structure. Thereby, a pixel is created within the pixels. One requirement of the design of the detector of the present invention may be that the charge clouds should not significantly exceed half of the size of one of the electrode structures. Thus, it is accepted to trade signal strength always (the factor of one half as explained above) against the above-mentioned benefit. The simple determination of the total charge can thus be provided in addition to the reconstruction of the location. Furthermore, it is a nice feature that by design, the intertwined and interleaved anodes solve the Nyquist sampling problem (i.e. that it is required to sample each D/2 mm provided your detector pixel has a width of D mm to avoid aliasing which is intrinsic in our design) with a linear detector array in an elegant manner.

In other words, the design proposed herein solves the problem of charge sharing. By providing intertwined and interleaved electrodes, it is assured that always one electrode captures half of the charge. Thus, in addition to determining the location of an event it is also possible to determine a total charge by multiplying the captured charge by two. Thereby, a simple, efficient and comparably cheap signal processing can be obtained.

Within this application, the processing of the signals is usually described from the point of view of one pixel. The signal generated by this one pixel is evaluated in conjunction with the signals generated by adjacent pixels to cope with the effects of charge sharing. It is, however, to be understood that the processing will usually be identical for each pixel. In other words the signal generated by each pixel is evaluated together with the signals of the adjacent pixels (except for pixels located at an edge of the detector which may not have an adjacent pixel on one or more sides and which may require an individual processing).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A detector for detecting ionizing radiation, comprising:
   a directly converting semiconductor layer for producing charge carriers in response to incident ionizing radiation; and
   a plurality of electrodes corresponding to pixels for registering the charge carriers and generating a signal corresponding to registered charge carriers;
   wherein a central electrode of the plurality of electrodes is structured to two-dimensionally intertwine with at least two adjacent electrodes to register the charge carriers by said central electrode and by at least one adjacent electrode;
   wherein said central electrode is structured to form a comb with comb-teeth to intertwine with comb-teeth of at least two adjacent electrodes forming a respective comb with comb-teeth; and
   wherein the comb-teeth of said central electrode alternate with the comb-teeth of the at least two adjacent electrodes in a longitudinal direction along which the central electrode and the two adjacent electrodes are arranged.

2. The detector as claimed in claim 1, further comprising:
   readout electronics for determining information on the location of the incident ionizing radiation and/or information on the energy of the incident ionizing radiation based on a central signal generated by said central electrode and at least two additional signals generated by said at least two adjacent electrodes.

3. The detector as claimed in claim 1, wherein
the comb-teeth have a rectangular form;
the first adjacent electrode is spaced apart from the second adjacent electrode by one comb-tooth of said central electrode.

4. The detector as claimed in claim 1, wherein
the plurality of electrodes is arranged in a line substantially perpendicular to the direction of the incident ionizing radiation; and
said central electrode is structured to intertwine with a first adjacent electrode on one side and a second adjacent electrode on the other side.

5. The detector as claimed in claim 4, wherein a first half of said central electrode intertwines with half of a first adjacent electrode and a second half of said electrode intertwines with half of a second adjacent electrode.

6. The detector as claimed in claim 2, wherein the readout electronics is configured to compare a signal level of the central signal with signal levels of the at least two additional signals and to determine a location of the incident ionizing radiation corresponding to a location of said central electrode if the signal level of the central signal is higher than the signal levels of the at least two additional signals.

7. The detector as claimed in claim 6, wherein the readout electronics is configured to increase a counter corresponding to said central electrode if the location of said central electrode is determined to correspond to the location of the incident ionizing radiation.

8. The detector as claimed in claim 6, wherein the readout electronics includes a comparator for comparing the signal level of the central signal to a predefined threshold for rejecting a noise signal corresponding to undesired noise effects by means of energy discrimination.

9. The detector as claimed in claim 6, wherein the readout electronics includes a peak detector for determining a peak of the signal level of the central signal and a comparator for comparing said peak to peaks of the signal levels of the at least two additional signals.

10. The detector as claimed in claim 1, wherein the electrodes of the plurality of electrodes have the same size and shape.

11. The detector as claimed in claim 1, wherein
the plurality of electrodes is arranged in a plane perpendicular to the direction of the incident ionizing radiation; and
said central electrode is structured to intertwine with at least three adjacent electrodes to form a two-dimensional grid.

12. The detector as claimed in claim 1, wherein the size of said central electrode is larger than twice the diameter of a cloud of charge carriers produced simultaneously.

13. An imaging apparatus comprising:
a radiation source for emitting ionizing radiation through an imaging area;
a detector as claimed in claim 1 for detecting ionizing radiation from said imaging area;
a gantry for supporting said detector to rotate the detector around said imaging area; and
a controller for controlling said detector to detect ionizing radiation at a plurality of projection positions during rotation around said imaging area.

14. A detection method, comprising the steps of:
receiving a central signal from a central electrode of a plurality of electrodes corresponding to pixels for registering charge carriers produced by a directly converting semiconductor layer in response to incident ionizing radiation, said central signal corresponding to registered charge carriers, said central electrode of the plurality of electrodes being structured to two-dimensionally intertwine with at least two adjacent electrodes to register the charge carriers by said central electrode and by at least one adjacent electrode, said central electrode being structured to form a comb with comb-teeth to intertwine with comb-teeth of at least two adjacent electrodes forming a respective comb with comb-teeth, the comb-teeth of said central electrode alternating with the comb-teeth of the at least two adjacent electrodes in a longitudinal direction along which the central electrode and the two adjacent electrodes are arranged;
receiving at least two additional signals from the at least two adjacent electrodes; and
determining information on the location of the incident ionizing radiation and/or information on the energy of the incident ionizing radiation based on the central and the at least two additional signals generated by said at least two adjacent electrodes.

15. A non-transitory computer readable medium programmed with program code, which, when executed by a processor of a computer, causes the processor to:
receive a central signal from a central electrode of a plurality of electrodes corresponding to pixels for registering charge carriers produced by a directly converting semiconductor layer in response to incident ionizing radiation,
said central signal corresponding to registered charge carriers, said central electrode of the plurality of electrodes being structured to two-dimensionally intertwine with at least two adjacent electrodes to register the charge carriers by said central electrode and by at least one adjacent electrode,
said central electrode being structured to form a comb with comb-teeth to intertwine with comb-teeth of at least two adjacent electrodes forming a respective comb with comb-teeth, the comb-teeth of said central electrode alternating with the comb-teeth of the at least two adjacent electrodes in a longitudinal direction along which the central electrode and the two adjacent electrodes are arranged;
receive at least two additional signals from the at least two adjacent electrodes; and
determine information on the location of the incident ionizing radiation and/or information on the energy of the incident ionizing radiation based on the central and the at least two additional signals generated by said at least two adjacent electrodes.

16. The detector as claimed in claim 1, wherein the comb-teeth have a rectangular form, and the comb-teeth have equal width in said longitudinal direction.

17. The detector as claimed in claim 1, wherein the comb-teeth have a rectangular form, the first adjacent electrode is spaced apart from the second adjacent electrode by one comb-tooth of said central electrode, and the comb-teeth have equal width in said longitudinal direction.

18. The detector as claimed in claim 1, wherein the directly converting semiconductor layer includes at least one material selected from a group consisting of: cadmium-telluride or cadmium zinc telluride.

19. The detection method of claim 14, further comprising:
comparing a signal level of the central signal with signal levels of the at least two additional signals; and
determining the location of the incident ionizing radiation corresponding to a location of said central electrode if the signal level of the central signal exceeds the signal levels of the at least two additional signals.

20. The detection method of claim 19, further comprising: comparing the signal level of the central signal to a predefined threshold for rejecting a noise signal corresponding to undesired noise effects by means of energy discrimination.

\* \* \* \* \*